FREQUENCY DEPENDENT WAVE TRANSMISSION DEVICE

Filed Dec. 6, 1965 5 Sheets-Sheet 1

INVENTOR
JOHN L. PUTZ
BY
Samuel E. Turner
ATTORNEY

INVENTOR
JOHN L. PUTZ
BY Samuel E. Turner
ATTORNEY

INVENTOR.
JOHN L. PUTZ
BY Samuel E. Turner
ATTORNEY

INVENTOR.
JOHN L. PUTZ
BY
Samuel E. Turner
ATTORNEY

INVENTOR
JOHN L. PUTZ
BY Samuel E. Turner
ATTORNEY

United States Patent Office 3,414,844
Patented Dec. 3, 1968

3,414,844

FREQUENCY DEPENDENT WAVE TRANSMISSION DEVICE

John L. Putz, Palo Alto, Calif., assignor to General Electric Company, a corporation of New York Filed Dec. 6, 1965, Ser. No. 511,956
7 Claims. (Cl. 333—10)

ABSTRACT OF THE DISCLOSURE

This invention relates to a gain equalizer for electromagnetic wave transmission which consists of first and second helices coupled for interchange of wave energy. The first helix which is connected to the input has a phase velocity characteristic which is independent of frequency while the second helix has a phase velocity characteristic which varies with frequency. The phase velocities of the two circuits are made equal at the frequency of maximum power from the input whereby excess power from the input is transmitted to the second helix and attenuated thereby equalizing the power output of the first helix. The device may be provided with an adjustment mechanism whereby the relative attenuation of various frequencies may be selected by modifying the degree of coupling between the helices.

This invention relates to an electromagnetic wave transmission device which provides a predetermined transmission characteristic over a band of frequencies. Depending upon the output connection, the device selectably provides a maximum or a minimum mid-band transmisison of the applied RF power. Features of the wave transmission device of the invention include simplicity, small size, impedance matching and ready adjustability of the transmission characteristic. Such a device finds many uses.

For example, when connected to provide maximum mid-band transmission the device of the invention provides a band-pass characteristic useful for attenuating frequencies above and below a frequency of interest.

When connected to provide minimum mid-band transmission the device of the invention may be used as a gain equalizer, for example, with wide band microwave amplifiers. Such amplifiers, a traveling wave tube for example, are known to exhibit considerable gain variation over their frequency range, the gain being as much as 10 db higher in the center of the frequency range as compared to the band edges. The wave transmission device of the invention can provide a loss characteristic which is complementary to the gain characteristic of such a microwave amplifier whereby the gain is equalized at all frequencies over the band width of the system.

In addition to a complementary loss characteristic an equalizer should be impedance matched at all frequencies to the device, such as a traveling wave tube, with which it is used. This requirement of impedance matching makes undesirable the use of purely reactive devices, such as reactively loaded transmission lines.

Prior gain equalizers for use at microwave frequencies have employed conventional techniques such as strip lines or coaxial lines loaded with lossy resonant circuits. Such prior devices are relatively large, are difficult to impedance match over wide frequency ranges and have not been readily adjustable.

The object of the present invention is to provide an electromagnetic wave transmission device which provides a frequency dependent transmission characteristic.

A more specific object of the invention is to provide a gain equalizer of small size and relative simplicity which is readily adjustable and impedance matched.

Another specific object of the invention is to provide a band-pass characteristic in a simple device which is impedance matched over the operating frequency range.

These and other objects are achieved according to the invention by providing a pair of slow-wave circuits which are coupled for frequency dependent energy transfer therebetween. The slow-wave circuits are designed to have different dispersion characteristics (dispersion being the variation in phase velocity with frequency). More specifically, the slow-wave circuits are designed to have the same phase velocity at one frequency and increasingly different phase velocities toward higher and lower frequencies.

A first of these slow-wave circuits receives the input microwave energy; it is designed to provide a low-loss signal path and, in accordance to the preferred form of the invention, it is designed to be non-dispersive whereby it readily can be impedance matched to input and output lines at all frequencies of the band of frequencies of interest.

However, to provide the required differences in phase velocities the second slow-wave circuit is designed to be dispersive. This dispersion serves two purposes. First, the relative amount of power that can be coupled from the first slow-wave circuit to the second slow-wave circuit decreases as the phase velocity difference increases toward the high and low frequencies of the band. This provides a frequency dependent coupling characteristic of desired form if the phase velocities are the same near the mid-frequency of the band.

However, the attainment of the desired coupling characteristic based only upon this variation of phase velocity with frequency ordinarily requires very loose coupling between the slow-wave circuits. With such loose coupling the coupling wavelength (defined as four times the axial length in which the maximum transfer of power from one slow-wave circuit to the other takes place) becomes very long and, thus, an undesirably long structure is required. On the other hand, with moderate coupling the power transferred from the first slow-wave circuit to the second slow-wave circuit remains undesirably high over the low frequency end of the frequency band unless the dispersion of the second slow-wave circuit is rather large.

For coupled circuits with co-directional coupling, the coupling wavelength is inversely proportional to the difference in the propagation constants of the fast and slow modes that result when the circuits are coupled. This difference is primarily determined by the phase velocities of the two circuits when the velocities are different and by the degree of coupling when the phase velocities are the same. As a result of these relationships the coupling wavelength decreases as the difference in phase velocities increases toward the low frequency end of the band.

Thus the second function of the relative dispersion of the slow-wave circuits is to control the coupling wavelength over the low end of the frequency range to a large degree independently of the degree of coupling between the circuits. Thus by proper selection of the mutual length of the slow-wave circuits, an operating condition can be obtained wherein, at the low end of the frequency band, the signal energy is coupled from the first slow-wave circuit to the second slow-wave circuit and back to the first slow-wave circuit before any substantial portion thereof reaches the ends of the second slow-wave circuit. Under this condition the output energy available from the second slow-wave circuit is at a minimum.

As the frequency is increased toward the center of the frequency range the coupling wavelength increases. If the length of the first slow-wave circuit is one-quarter of a coupling wavelength at the mid-band frequency for which the phase velocities of the coupled slow-wave circuits are equal, the substantial portion of the signal power near the mid-frequencies of the range will be transferred to the second slow-wave circuit. Under this condition the power available from the first slow-wave circuit is at a minimum and the power available from the second slow-wave circuit is at a maximum.

The ratio of the power available from the first slow-wave circuit to the power available from the second slow-wave circuit at mid-band can be controlled by adjustment of the coupling between the slow-wave circuits. This adjustment of coupling does not substantially affect the low frequency performance because the coupling wavelength at the low frequency end of the band is determined primarily by the dispersion.

Above the mid-band frequencies the power transferred from one slow-wave circuit to the other again decreases. This decrease is primarily due to a decrease in coupling with increasing frequency. The increasing difference in phase velocities, due to the relative dispersion of the circuits, and a decrease in the coupling wavelength also decreases the amount of power transferred to the second slow-wave circuit. These effects thus provide the desired decrease in power transfer from the first to the second slow-wave circuit toward the upper end of the frequency band.

Thus by appropriate selection of the values of the device parameters, specifically the dispersion, the coupling and the mutual length of the slow-wave circuits, a wave transmission device according to the invention provides a frequency dependent transmission characteristic.

As mentioned hereinbefore, the input signal is preferably applied to one end of the first (preferably non-dispersive) slow-wave circuit for ease of impedance matching. The corresponding end of the second (dispersive) slow-wave circuit is coupled to or terminated in a lossy load. A first output signal is taken from the other end of the first slow-wave circuit. Since maximum transfer of power to the second slow-wave circuit occurs at mid-band, this first output signal has an equalizing characteristic being maximum at band edges and minimum at mid-band. A second output signal is taken from the other end of the second slow-wave circuit. Again, since maximum transfer of power to the second slow-wave circuit occurs at mid-band, this second output signal has a band-pass characteristic, being minimum at band edges and maximum at mid-band.

The invention is described more specifically hereinafter with reference to illustrated embodiments thereof depicted by the accompanying drawing wherein.

The basic principle of the invention is the use of controlled dispersion in coupled slow-wave circuits to obtain frequency dependent coupling therebetween. Although there are many slow-wave circuits suitable for use in the practice of the invention, the well-known helix slow-wave circuit is shown in the illustrated embodiments herein described.

Figure 1:
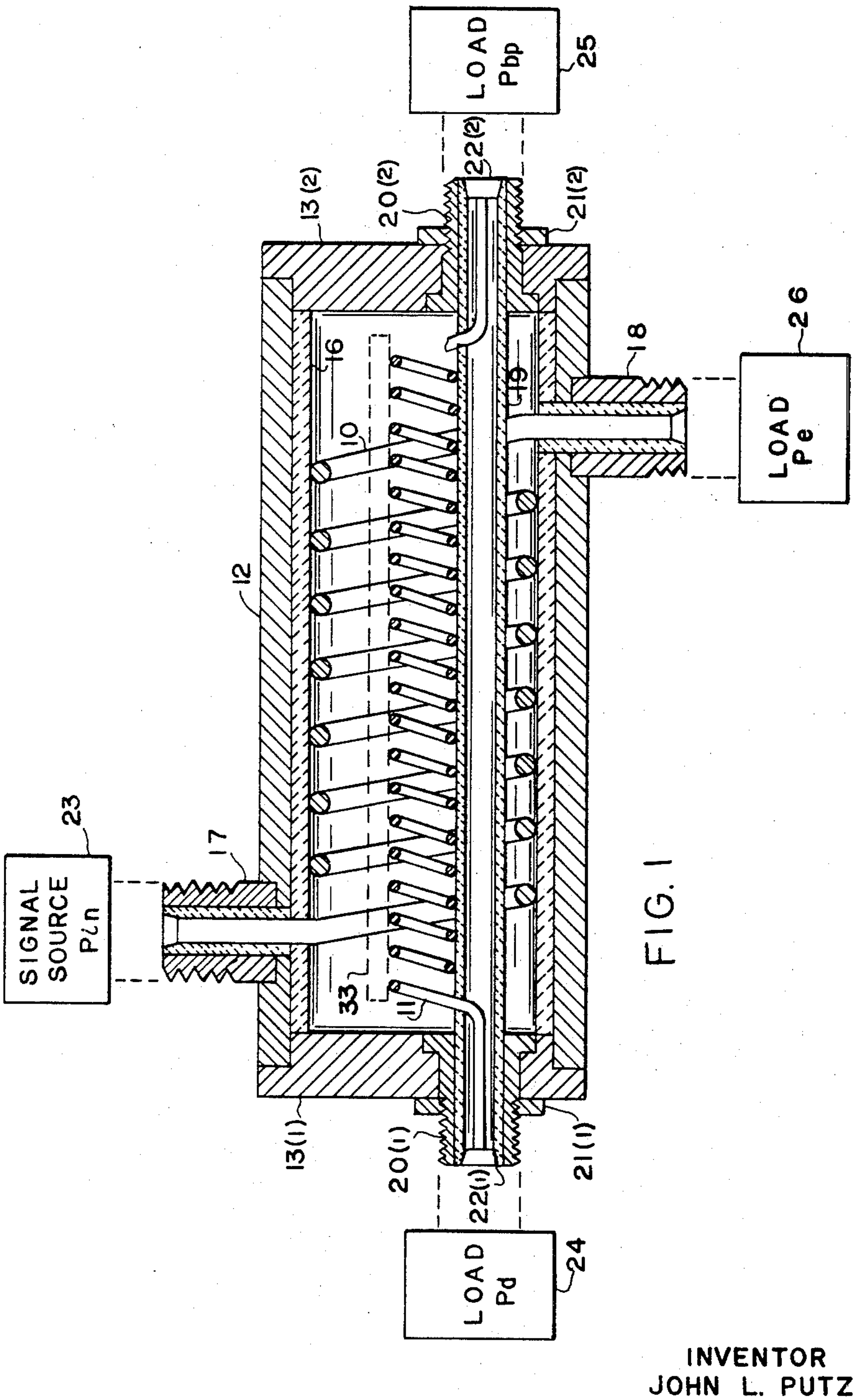
FIGURE 1 is a longitudinal cross-section illustration of a general embodiment of the invention.

FIG. 1 is a longitudinal cross-section illustration of a general embodiment of the invention. As shown therein the structure of a frequency dependent wave transmission device according to the invention comprises an outer helix 10 and an inner helix 11 wound with opposite senses and contained in the cylindrical chamber formed by a conductive housing 12 and a pair of end members 13(1) and 13(2).

Figure 2:
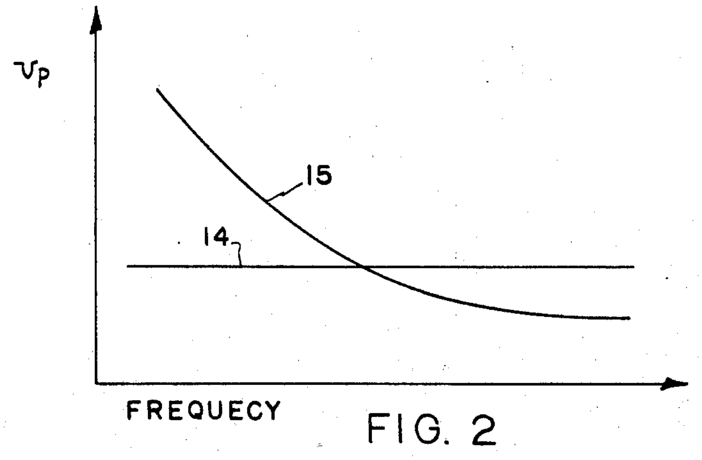
FIGURE 2 is an illustration of typical curves of the phase velocities of the slow-wave circuits of the preferred form of the device of the invention.

The outer helix 10 is designed to provide a low-loss signal path and preferably to the substantially non-dispersive over the frequency band of interest while the inner helix 11 is designed to be dispersive, that is, the phase velocity of the inner helix 11 substantially changes with frequency. This is shown in FIG. 2 which is a curve of phase velocity $v_p$ versus frequency and wherein a curve 14 represents the phase velocity of the non-dispersive outer helix 10 over a range of frequencies and a curve 15 represents the phase velocity of the dispersive inner helix 11 over the same frequency range.

(Alternatively, both slow-wave circuits could be dispersive. For example, the outer helix 10 could have a phase velocity which increases with increasing frequency while the phase velocity of the inner helix 11 decreases with frequency as shown. Such an arrangement is useful for obtaining greater phase velocity differences. However, such an arrangement is not preferred because of the difficulty of providing impedance matching over the band.)

The helix 10 is supported within the housing 12 by a sleeve 16 formed of low-loss insulating material. A coaxial connector 17 and a coaxial connector 18 make connection with the left and right ends, respectively, of the helix 10.

The helix 11 is supported between the end members 13(1) and 13(2) by a support tube 19, formed of low-loss insulating material such as quartz, to which the helix 11 is cemented. The left end of support tube 19 is cemented within a hollow, flanged, externally threaded, conductive sleeve 20(1) which is journaled in an aperture in the end member 13(1) and retained by a locking nut 21(1). The left end of the inner helix 11 is passed through a hole in the rod 14 and extended coaxially with the sleeve 20(1) to make connection with a button 22(1) whereby the sleeve 20(1) serves as a coaxial connector for the left end of the helix 11. A similar arrangement comprising a conductive sleeve 20(2), a locking nut 21(2) and a button 22(2) forms a coaxial connector for the right end of the helix 11.

As illustrated in FIG. 1, the longitudinal axes of the helices 10 and 11 coincide, that is, the helices are shown coaxially positioned. This is the position of least coupling between the circuits. However, it is to be noted that the sleeves 20(1) and 20(2), to which the support tube 19 is attached are journaled off the centers of the end members 13(1) and 13(2). Thus by rotational movement of the support tube 19 (and the sleeves 20(1) and 20(2)) the axis of the inner helix 11 may be moved off the axis of the outer helix 10 whereby the coupling between the helices may be increased.

In the preferred manner of operation of the device of the invention an input signal power P*in* is applied from a signal source 23 to the outer (preferably non-dispersive) helix 10 via the connector 17. The left end of the inner helix 11 is terminated in a load 24 via the connector formed by sleeve 20(1). The load 24 dissipates the power designated P*d* which is propagated in the non-preferred leftward direction by the helix 11 including any power reflected from the right end of the helix 11. The right end of the helix 11 is connected, via the connector formed by sleeve 20(2), to a load or utilization circuit 25. The power received by load 25 is designated P*bp* to indicate that the signal coupled from helix 10 to helix 11 and received by the load 25 displays a band-pass characteristic, being maximum at mid-band and minimum at band edges.

Figure 3:
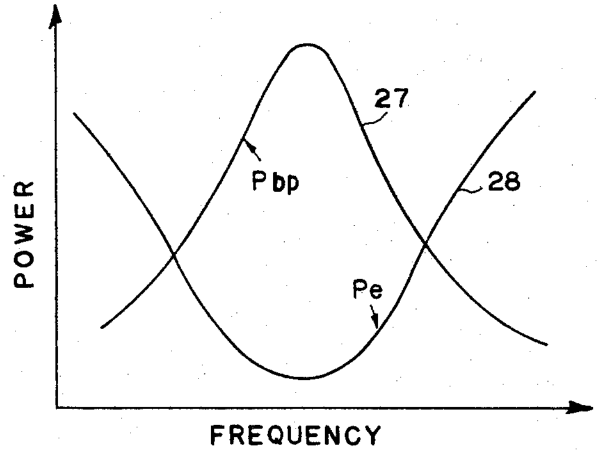
FIGURE 3 is an illustration of typical output power versus frequency curves of the device of the invention.

The right end of the helix 10 is connected, via the connector 18, to a load or utilization circuit 26. The power received by load 26 is designated P*e* to indicate that the signal received thereby displays an equalizing characteristic, being minimum at mid-band and maximum at band edges. Illustrated in FIG. 3 are typical power versus frequency curves 27 and 28 of the power P*bp* received by load 25 and power P*e*, received by load 26, respectively, for a constant level of input RF power P*in* from source 23 and for a moderate value of coupling between helices 10 and 11.

Neglecting device losses, the sum of the output signals equals the input signals as follows:

$$Pin=Pd+Pe+Pbp$$

The net power transferred from the outer helix 10 and available from the inner helix 11 is designated a power P*t*; therefore, $$Pt=Pd+Pbp$$

$$Bbp=Pt-Pd$$

and $$Pe=Pin-Pt$$

First order calculations of the transferred power P*t* may be made according to the following relationship:

$$Pt=PinR \sin^2 \frac{2\pi L}{\lambda_c}$$

where

P*in* is the power applied to helix 10 from source 23; R is a coupling factor defined as the ratio of the maximum power that can be coupled from one helix to the other to the incident power;

L is the mutual or common length of the helices; and $\lambda_c$ is the coupling wavelength defined as four times the distance in which the maximum transfer of power from one helix to the other takes place.

Figure 4:
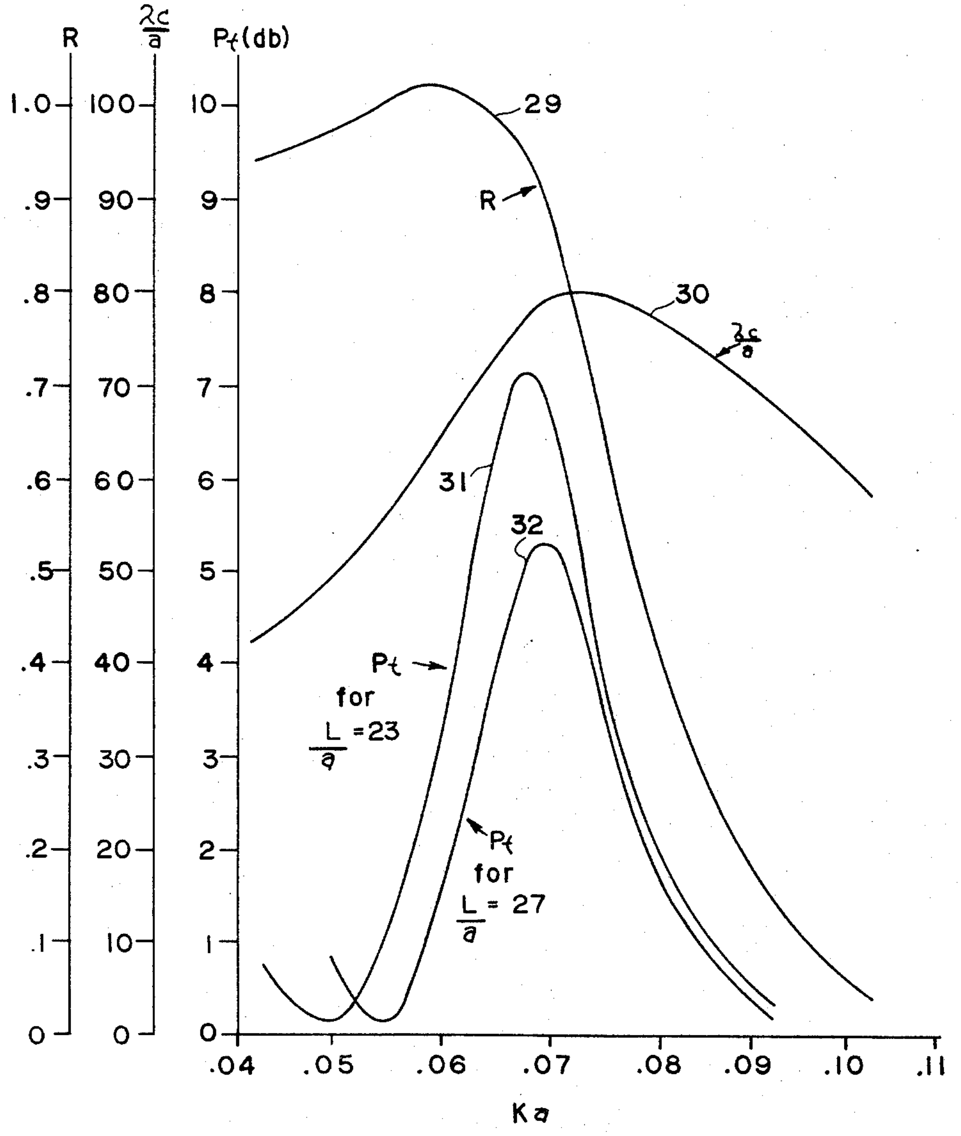
FIGURE 4 is an illustration of normalized curves of the coupling factor, coupling wavelength and transferred power of a device according to the invention.

FIGURE 4 shows normalized curves, calculated from the foregoing relationship, of the coupling factor R, a coupling wavelength factor $\lambda_c/a$ and the transferred power P*t* versus *ka* where $k=2\pi f/c$ (where *c* is the velocity of light) and "*a*" is the average radius of the inner helix 11.

As shown in FIG. 4 by a curve 29 the coupling factor R remains high over the lower half of the frequency band but drops sharply above mid-band. This high frequency drop in the value of the coupling factor R is primarily due to the disparity in helix diameters, typical outer-to-inner helix diameter ratios being in the order of three for the present application.

As shown by a curve 30 of the coupling wavelength factor $\lambda_c/a$ the coupling wavelength is longest near mid-band. It decreases rather rapidly toward the low frequency end of the band and also decreases at a lesser rate toward the higher frequencies.

Two curves of the power P*t* (the power transferred from the outer helix 10 to the inner helix 11) are shown in FIG. 4. A curve 31 shows the power P*t* for an *L/a* ratio of 23 while a curve 32 shows the power P*t* for an *L/a* ratio of 27.

Near the low frequency end, the curve 31 of P*t* is minimum at a *ka* near .05, that is, the power available from the inner helix 11 is minimum near this point even though the coupling factor R is high at this point. This minimum of transferred power P*t* is due to the fact that at this point the mutual length L of the helices (for the present example, the length of the outer helix 10) is one-half of a coupling wavelength whereby the input signal applied to helix 10 is coupled to the inner helix 11 and back to the outer helix 10 over the length L.

As the frequency is increased toward mid-band the coupling factor R remains high and the coupling wavelength increases so that the length L approaches one-quarter of a coupling wavelength. Thus the transferred power P*t* increases. As shown in FIG. 4, near a *ka* of .07 (for the curve 31) the power P*t* transferred from the outer helix 10 to the inner helix 11 is a maximum.

As frequency is increased above mid-band the transferred power P*t* decreases, primarily because of the rapid decrease of the coupling factor R and secondarily because of the decrease in coupling wavelength and the increasing difference in phase velocities of the two circuits.

The curve 32 illustrates the effect of an increase in the mutual length L of the helices, other helix dimensions being held constant. It is seen that such an increase in L decreases the maximum transferred power and shifts the low-frequency minimum and mid-band maximum points upward in frequency.

Figure 5:
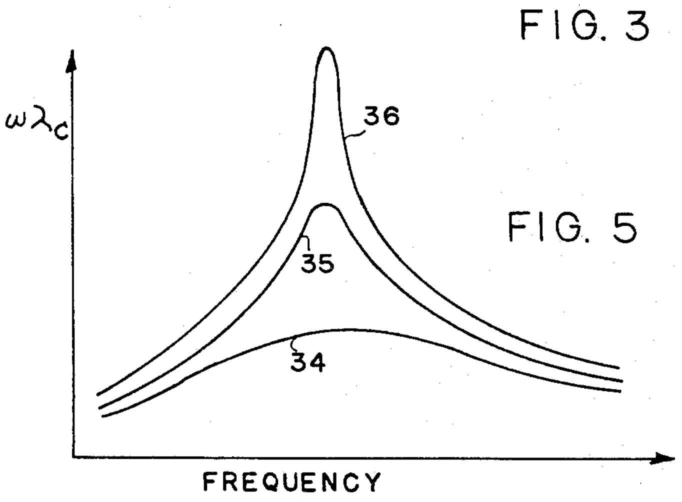
FIGURE 5 is an illustration of typical coupling wavelength versus frequency curves for various degrees of coupling between the slow-wave circuits of a device according to the invention.

For coupled circuits with co-directional coupling, the coupling wavelength $\lambda_c$ is inversely proportional to the difference in the propagation constants of the two modes that result when the circuits are coupled. This difference is primarily determined by the phase velocities of the two circuits when the velocities are different and by the degree of coupling when the phase velocities are the same. The helices 10 and 11 are designed to have the same phase velocity near mid-band as illustrated in FIG. 2. Thus by changing the coupling between the helices the mid-band coupling wavelength can be altered without substantial change of the coupling wavelength over the low and high frequency portions of the band. This is shown in FIG. 5 which illustrates curves 34, 35 and 36 of $\omega\lambda_c$ versus frequency for tight, moderate and loose coupling, respectively, between the helices. Thus by adjustment of the coupling between helices, the peak or maximum transferred power P*t* at mid-band can be adjusted without substantially affecting the low and high frequency performance.

In a wave transmission device constructed according to the invention for operation at mid-band frequency of about 3.5 gc., a substantially non-dispersive outer helix was formed of 17.5 turns of No. 20 copper wire, wound 20 turns per inch with an outside diameter of 0.282 inch. For matching the outer helix to 50 ohm source and load impedances the insulating support sleeve (sleeve 16 of FIG. 1) was formed of polytetrafluoroethylene of 0.015 inch in thickness. A dispersive inner helix was formed of 0.005 inch diameter tungsten wire, wound 90 turns per inch with an outside diameter of 0.075 inch. The maximum standing wave ratio (VSWR) was found to be less than 1.5 to 1 over a frequency range of 2–5 gc.

The frequency at which maximum transfer of power to the inner helix takes place may be shifted without reconstruction of the helices by the use of dielectric loading. Thus as illustrated in FIG. 1, a dielectric member 33 (shown with dashed lines for clarity of the drawing) may be positioned adjacent the inner helix 11 and retained in any convenient manner. The member 33 is formed of a material, such as sapphire, having a high dielectric constant. This dielectric loading reduces the phase velocity $v_p$ of the inner helix so that the frequency of matched phase velocities of the outer and inner helices is lower. (In effect, the curve 15 of FIG. 2 is shifted to the left.) It is found that by appropriate selection of the cross-section area of the dielectric member 33, the maximum power transfer peak can be shifted downward in frequency over a range of several hundred megacycles in a device having the helix dimensions set forth above. (The dielectric member 33 need not be placed in the position shown in FIG. 1. It may, for example, be cemented along the support tube 19. It may also take the form of a rod and be inserted within the support tube 19.)

Figure 6:
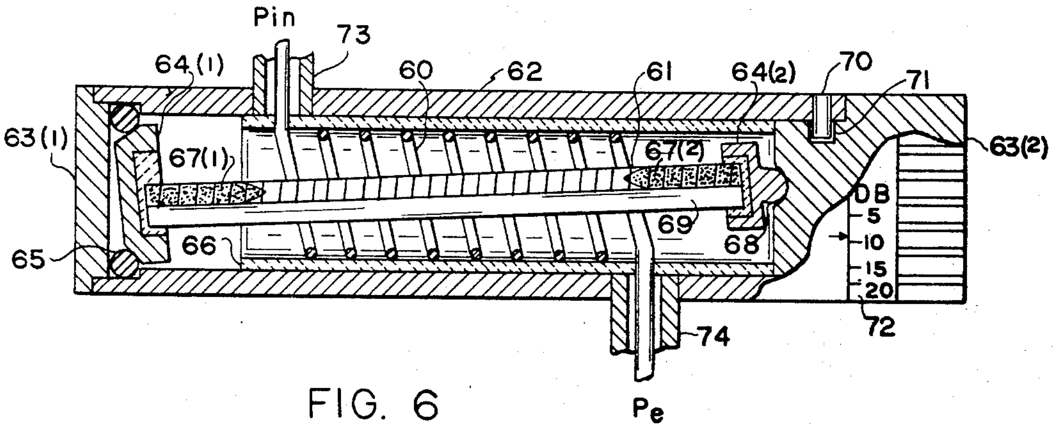
FIGURE 6 is a partially cut away longitudinal cross-section illustration of a specific embodiment of the invention as adapted for use as a gain equalizer.

Shown in FIG. 6 is an embodiment of the invention specifically adapted for use as an adjustable gain equalizer. An outer helix 60 is supported by an insulating sleeve 66 within a cylindrical chamber of a conductive housing 62. An inner helix 61 (shown schematically) is supported by an insulating support rod or tube 69. The inner helix 61 is terminated at either end by a pair of lossy members 67(1) and 67(2) formed of carbon loaded epoxy, for example, for dissipating the power P*t* transferred from the outer helix to the inner helix.

The left end of the support rod 69 is cemented to a cup-shaped support member 64(1). The support member 64(1) is resiliently retained within the housing 62 by an elastic O ring positioned between an end member 63(1) and a chamfered edge of the support member 64(1).

The right end of support rod 69 is cemented to a cup-shaped support member 64(2) formed with a hemispherical extension 68 which fits within an eccentrically positioned depression of corresponding shape in an end member 63(2). The end member 63(2) is retained for rotational movement in the housing 62 by two or more radially spaced pins, such as a pin 70, which fit into a circumferential groove 71 in the end member 63(2). Rotational movement of the end member 63(2) thus causes the inner helix 61 to pivot on its resiliently mounted left end whereby the coupling between the helices can be adjusted for adjustment of maximum loss. The end member 63(2) and the right end of the housing 62 are shown partially cut away to illustrate that the end member 63(2) can be inscribed with a scale 72 calibrated in power loss for the corresponding positions of the end member. The right-most end of the end member 63(2) can be knurled, as shown, to form an adjustment knob.

Input RF power P*in*, from a traveling wave tube or the like, is applied to the left end of the outer helix 60 via a coaxial connector 73 and the output power P*e* is taken from the right end of the helix 60 via a coaxial connector 74.

Figure 7:
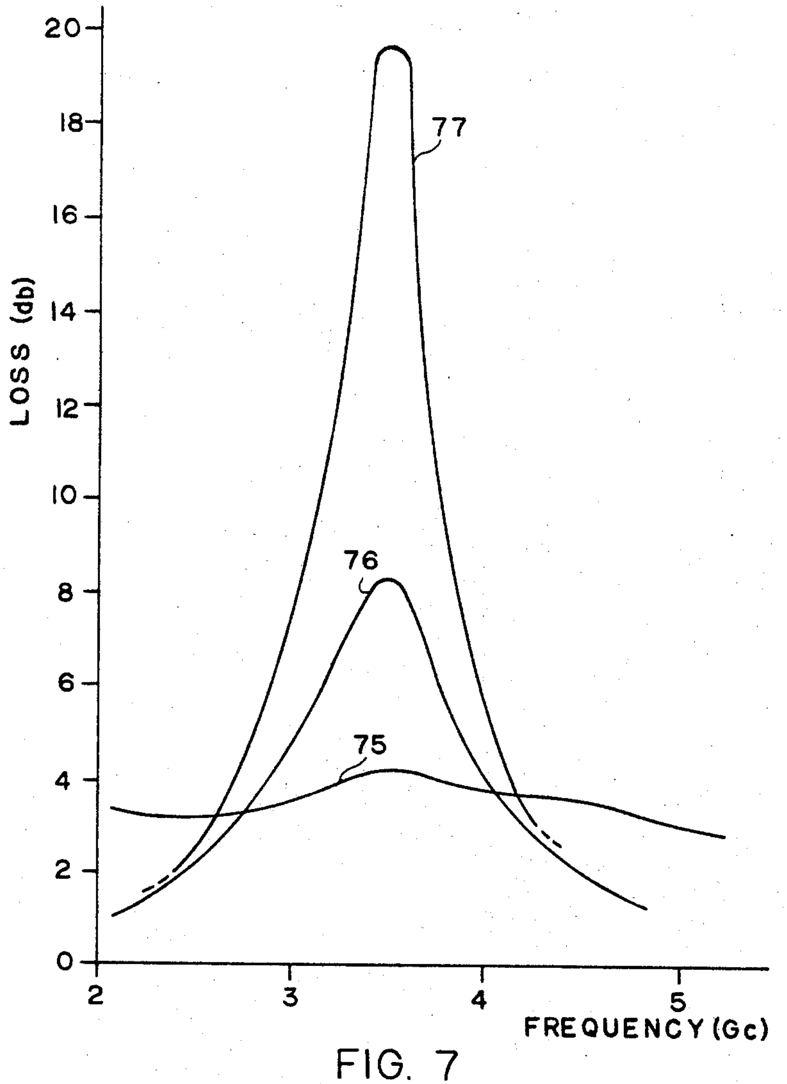
FIGURE 7 is an illustration of loss versus frequency curves of the device of FIG. 6.

FIGURE 7 illustrates loss versus frequency characteristic curves 75, 76 and 77 of the device of FIG. 6 for tight, moderate and loose coupling, respectively, of the helices, as obtained at corresponding settings of the end member 63(2). The loss illustrated in FIG. 7 is, of course, the power P*t* transferred from the outer helix to the inner helix and dissipated in the lossy terminations 67(1) and 67(2) of the inner helix. It is also noted that for the tightly coupled case, a rather uniform loss of 3–4 db is obtained across the frequency band.

Figure 8:
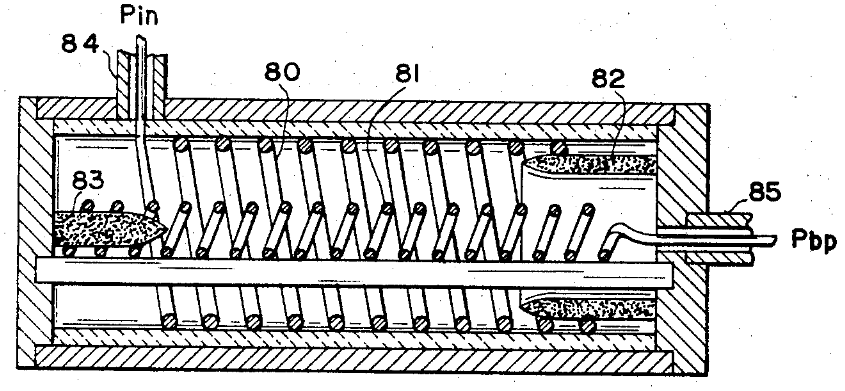
FIGURE 8 is a longitudinal cross-section view of a specific embodiment of the invention adapted to provide a band-pass output power characteristic.

Shown in FIG. 8 is an embodiment of the invention specifically adapted to provide a band-pass characteristic. The right end of an outer helix 80 is terminated by a sleeve 82 formed of lossy material for dissipating the power that is not transferred to an inner helix 81. The inner helix 81 is terminated at its left end by a lossy member 83. Input RF power P*in* is applied to the left end of the outer helix via a coaxial connector 84 and the output power P*bp* is taken from the right end of the inner helix 81 via a coaxial connector 85. The output power P*bp* is maximum at mid-band and minimum at band edges as shown by the curve 27 of FIG. 3.

The present invention is based upon the use of controlled dispersion in coupled slow-wave circuits to obtain frequency dependent coupling therebetween and specific embodiments have been described herein in illustration of the invention. However, the invention is not limited to the particular embodiments described. For example, slow-wave circuits other than the simple helices may be more appropriate for a given application. It is known that a circuit formed of two or four parallel (symmetrical) helices, bonded at each turn where they touch provides a more dispersive circuit than a single helix for certain frequency ranges. Similarly a cross-wound or ring-bar helix provides more dispersion than a simple helix. Such slow-wave circuits are described, for example, by C. K. Birdsall et al., in an article entitled "Modified Contra-Wound Helix Circuits for High-Power Traveling-Wave Tubes," pp. 190–204, Trans. I.R.E., PGED, vol. 3, 1956.

The helices need not be coaxially positioned. Power can be coupled between parallel positioned slow-wave circuit. The parallel arrangement may be advantageous, for example, at higher frequencies where the size of a slow-wave circuit is small.

As described hereinbefore, the input RF power is preferably applied to a non-dispersive slow-wave circuit. The input RF power could, instead, be applied to a dispersive slow-wave circuit; however, problems of matching the impedances of the input line and a dispersive slow-wave circuit are ordinarily more difficult.

Thus what has been described is an electromagnetic wave transmission device providing a frequency dependent transmission characteristic. The device is small in size and is relatively simple. The device is adjustable as to operating frequency and transmission characteristic and it is non-reactive whereby impedance matching to the devices with which it is used is maintained over the frequency range of operation.

While the principles of the invention have been made clear in the illustrative embodiments, there will be obvious to those skilled in the art, many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. An electromagnetic wave energy transmission device having a frequency dependent transmission characteristic over a band of frequencies for equalizing the wave energy transmitted therethrough comprising a first helix slow-wave circuit, means for connecting said first helix slow-wave circuit to a source of wave energy which energy varies in power relative to frequency over the band; said first helix slow-wave circuit having a phase velocity and impedance characteristics which are substantially independent of frequency; a second helix slow-wave circuit mounted within said first helix slow-wave circuit and having a phase velocity characteristic dependent on frequency; the phase velocities of said first and second helix slow-wave circuits being the same at a frequency near the frequency of maximum power from the source and different at frequencies above and below said frequency; and means for receiving wave energy from first and second helix slow-wave circuits whereby the power transmitted from said first helix slow-wave circuit is substantially independent of frequency.

2. The device defined by claim 1 wherein the phase velocities of said slow-wave circuits are the same at a frequency near the midfrequency of said band.

3. The device defined by claim 1 wherein the mutual length of said slow-wave circuits is substantially equal to one-half of a coupling wavelength at the low frequency of said band.

4. The device defined by claim 1 further including means for selectively adjusting the coupling between said slow-wave circuits.

5. The device defined by claim 1 further including dielectric means for selectively altering the phase velocity of at least one of said slow-wave circuits.

6. The device defined by claim 1 wherein said means for receiving wave energy from said second slow-wave circuit includes wave energy absorptive members for terminating said slow-wave circuit.

7. The device defined by claim 1 wherein the helix forming said first slow-wave circuit has a diameter greater than two times the diameter of the helix forming said second slow-wave circuit.

References Cited

UNITED STATES PATENTS

| | | | |
|---|---|---|---|
| 2,588,831 | 3/1952 | Hansell | 315—3.6 |
| 2,725,499 | 11/1955 | Field | 315—3.6 |
| 2,773,213 | 12/1956 | Dodds | 315—3.6 |
| 2,803,777 | 8/1957 | Bryant | 315—3.5 |
| 2,811,673 | 10/1957 | Kompfner | 333—10 X |
| 2,894,168 | 7/1959 | Wing et al. | 315—3.6 |
| 2,925,565 | 2/1960 | Cook et al. | 315—3.6 X |
| 3,349,278 | 10/1967 | Huse | 315—3.6 |

HERMAN KARL SAALBACH, *Primary Examiner.*

SAXFIELD CHATMON, Jr., *Assistant Examiner.*